(12) United States Patent
Remaley et al.

(10) Patent No.: US 11,061,476 B2
(45) Date of Patent: Jul. 13, 2021

(54) HAPTIC FEEDBACK APPARATUS

(71) Applicant: Microsoft Technology Licensing, LLC, Redmond, WA (US)

(72) Inventors: Jacquelin Leah Remaley, Redmond, WA (US); Sang Ho Yoon, Redmond, WA (US); James David Holbery, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/422,611

(22) Filed: May 24, 2019

(65) Prior Publication Data

US 2020/0371590 A1   Nov. 26, 2020

(51) Int. Cl.
*G06F 3/01*   (2006.01)

(52) U.S. Cl.
CPC .............. *G06F 3/016* (2013.01); *G06F 3/014* (2013.01)

(58) Field of Classification Search
CPC .................................................... A63F 13/212
See application file for complete search history.

(56) References Cited

U.S. PATENT DOCUMENTS

| | | |
|---|---|---|
| 2,897,425 A | 7/1959 | Waring et al. |
| 4,753,442 A | 6/1988 | Bland |
| 4,987,332 A | 1/1991 | Yamamoto et al. |
| 5,173,834 A | 12/1992 | Sogoh |
| 5,184,319 A | 2/1993 | Kramer |
| 5,429,140 A | 7/1995 | Burdea et al. |
| 5,516,249 A | 5/1996 | Brimhall |
| 5,631,861 A | 5/1997 | Kramer |
| 6,128,004 A | 10/2000 | McDowall |
| 6,413,229 B1 | 7/2002 | Kramer et al. |
| 6,524,681 B1 | 2/2003 | Seitz et al. |
| 6,790,308 B2 | 9/2004 | Murphy et al. |
| 6,809,462 B2 | 10/2004 | Pelrine et al. |
| 6,966,882 B2 | 11/2005 | Horst |

(Continued)

FOREIGN PATENT DOCUMENTS

| | | |
|---|---|---|
| CN | 100998527 A | 7/2007 |
| CN | 106726027 A | 5/2017 |

(Continued)

OTHER PUBLICATIONS

"Non Final Office Action Issued in U.S. Appl. No. 15/968,677", dated Apr. 9, 2020, 30 Pages.

(Continued)

*Primary Examiner* — Fabricio R Murillo Garcia
(74) *Attorney, Agent, or Firm* — Alleman Hall Creasman & Tuttle LLP

(57) ABSTRACT

Examples disclosed herein relate to providing haptic feedback. One disclosed example provides a wearable article configured to provide haptic feedback, the wearable article including a base configured to be worn on a body part, a force-applying mechanism coupled with the base, and a haptic feedback apparatus coupled with the base, the haptic feedback apparatus including a lever supported by a frame and coupled with the force-applying mechanism, the lever positioned to move relative to the frame and apply pressure on a surface of the body part when a force is applied by the force applying mechanism.

12 Claims, 8 Drawing Sheets

(56) References Cited

U.S. PATENT DOCUMENTS

| | | |
|---|---|---|
| 7,046,151 B2 | 5/2006 | Dundon |
| 7,056,297 B2 | 6/2006 | Dohno et al. |
| 7,166,953 B2 | 1/2007 | Heim et al. |
| 7,250,935 B2 | 7/2007 | Kubota et al. |
| 7,390,157 B2 | 6/2008 | Kramer |
| 7,407,895 B2 | 8/2008 | Kunitake et al. |
| 7,481,782 B2 | 1/2009 | Scott et al. |
| 7,537,573 B2 | 5/2009 | Horst |
| 7,545,349 B2 | 6/2009 | Yamada |
| 7,551,419 B2 | 6/2009 | Pelrine et al. |
| 7,920,124 B2 | 4/2011 | Tokita et al. |
| 8,029,414 B2 | 10/2011 | Ingvast et al. |
| 8,049,772 B2 | 11/2011 | Lipton et al. |
| 8,058,853 B2 | 11/2011 | Murota |
| 8,138,895 B2 | 3/2012 | Kato et al. |
| 8,160,743 B2 | 4/2012 | Birkenbach et al. |
| 8,164,232 B2 | 4/2012 | Kornbluh et al. |
| 8,255,079 B2 | 8/2012 | Linn et al. |
| 8,325,458 B2 | 12/2012 | Prahlad et al. |
| 8,330,590 B2 | 12/2012 | Poupyrev et al. |
| 8,362,882 B2 | 1/2013 | Heubel et al. |
| 8,665,241 B2 | 3/2014 | Heubel et al. |
| 8,833,826 B2 | 9/2014 | Garcia et al. |
| 8,860,336 B2 | 10/2014 | Anderson et al. |
| 8,861,171 B2 | 10/2014 | Prahlad et al. |
| 8,882,285 B2 | 11/2014 | Walsh |
| 8,964,351 B2 | 2/2015 | Horinouchi |
| 8,998,831 B2 | 4/2015 | Sankai |
| 9,093,926 B2 | 7/2015 | Prahlad et al. |
| 9,120,220 B2 | 9/2015 | Bergelin et al. |
| 9,148,074 B2 | 9/2015 | Boughtwood |
| 9,170,288 B2 | 10/2015 | O'Brien et al. |
| 9,180,866 B2 | 11/2015 | Helmer et al. |
| 9,266,233 B2 | 2/2016 | Kornbluh et al. |
| 9,301,563 B2 | 4/2016 | Hardy et al. |
| 9,375,382 B2 | 6/2016 | Fausti et al. |
| 9,401,668 B2 | 7/2016 | Prahlad et al. |
| 9,403,056 B2 | 8/2016 | Weinberg et al. |
| 9,403,272 B2 | 8/2016 | Kornbluh et al. |
| 9,417,693 B2 | 8/2016 | Seth |
| 9,427,864 B2 | 8/2016 | Kornbluh et al. |
| 9,529,433 B2 | 12/2016 | Shankar et al. |
| 9,606,624 B2 | 3/2017 | Cruz-Hernandez et al. |
| 9,710,060 B2 | 7/2017 | McMillen et al. |
| 9,846,482 B2 | 12/2017 | Seth |
| 9,851,082 B2 | 12/2017 | Thompson et al. |
| 9,921,609 B2 | 3/2018 | Levesque et al. |
| 9,931,235 B2 | 4/2018 | Summer et al. |
| 9,939,468 B1 | 4/2018 | Dyszel |
| 9,950,422 B2 | 4/2018 | Kornbluh et al. |
| 9,983,672 B2 | 5/2018 | Olien et al. |
| 10,012,276 B2 | 7/2018 | Eckerle et al. |
| 10,013,062 B1 | 7/2018 | Corson et al. |
| 10,025,387 B2 | 7/2018 | Keller et al. |
| 10,055,019 B2 | 8/2018 | Beran |
| 10,055,022 B2 | 8/2018 | Appleyard et al. |
| 10,082,872 B2 | 9/2018 | Cruz-Hernandez et al. |
| 10,082,875 B1 | 9/2018 | Kim et al. |
| 10,104,923 B2 | 10/2018 | Howland et al. |
| 10,105,839 B2 | 10/2018 | Kornbluh et al. |
| 10,137,362 B2 | 11/2018 | Buchanan et al. |
| 10,197,459 B2 | 2/2019 | Keller et al. |
| 10,228,396 B2 | 3/2019 | Gisby et al. |
| 10,248,200 B2 | 4/2019 | Cohen et al. |
| 10,275,025 B2 | 4/2019 | Black et al. |
| 10,281,982 B2 | 5/2019 | Keller et al. |
| 10,317,998 B2 | 6/2019 | Holbery et al. |
| 10,355,624 B2 | 7/2019 | Majidi et al. |
| 10,366,583 B2 | 7/2019 | Khoshkava et al. |
| 10,372,213 B2 | 8/2019 | Keller et al. |
| 10,381,143 B2 | 8/2019 | Khoshkava et al. |
| 10,423,227 B2 | 9/2019 | Gu |
| 10,427,293 B2 | 10/2019 | Asbeck et al. |
| 10,433,367 B2 | 10/2019 | Pratt et al. |
| 10,437,335 B2 | 10/2019 | Daniels |
| 10,466,784 B2 | 11/2019 | Cohen et al. |
| 10,474,236 B1 | 11/2019 | Stewart et al. |
| 10,514,759 B2 | 12/2019 | Taylor et al. |
| 10,521,947 B2 | 12/2019 | Yokokawa |
| 10,528,138 B2 | 1/2020 | Keller et al. |
| 10,543,110 B2 | 1/2020 | Piercy et al. |
| 10,561,565 B2 | 2/2020 | John et al. |
| 10,564,722 B2 | 2/2020 | Keller et al. |
| 10,572,011 B2 | 2/2020 | Holbery |
| 10,572,014 B2 | 2/2020 | Keller et al. |
| 10,595,618 B2 | 3/2020 | Wang et al. |
| 10,603,190 B2 | 3/2020 | Mateus Dias Quinaz |
| 10,627,783 B2 | 4/2020 | Rothkopf et al. |
| 10,663,016 B2 | 5/2020 | Schmitz et al. |
| 2002/0130673 A1 | 9/2002 | Pelrine et al. |
| 2003/0125781 A1 | 7/2003 | Dohno et al. |
| 2004/0084261 A1 | 5/2004 | Burgoon et al. |
| 2004/0102723 A1 | 5/2004 | Horst |
| 2004/0174337 A1 | 9/2004 | Kubota et al. |
| 2005/0012485 A1 | 1/2005 | Dundon |
| 2006/0004307 A1 | 1/2006 | Horst |
| 2006/0094989 A1 | 5/2006 | Scott et al. |
| 2006/0115348 A1 | 6/2006 | Kramer |
| 2006/0152098 A1 | 7/2006 | Horst et al. |
| 2006/0261516 A1 | 11/2006 | Kunitake et al. |
| 2007/0016265 A1 | 1/2007 | Davoodi et al. |
| 2007/0129846 A1 | 6/2007 | Birkenbach et al. |
| 2007/0195482 A1 | 8/2007 | Muka et al. |
| 2008/0059131 A1 | 3/2008 | Tokita et al. |
| 2008/0089002 A1 | 4/2008 | Pelrine et al. |
| 2008/0153590 A1 | 6/2008 | Ombrellaro et al. |
| 2009/0102620 A1 | 4/2009 | Kato et al. |
| 2010/0007240 A1 | 1/2010 | Kornbluh et al. |
| 2010/0041521 A1 | 2/2010 | Ingvast et al. |
| 2010/0045251 A1 | 2/2010 | Murota |
| 2010/0085169 A1 | 4/2010 | Poupyrev et al. |
| 2010/0141407 A1 | 6/2010 | Heubel et al. |
| 2010/0318006 A1 | 12/2010 | Horst |
| 2011/0071664 A1 | 3/2011 | Linn et al. |
| 2011/0101823 A1 | 5/2011 | Anderson et al. |
| 2011/0187637 A1 | 8/2011 | Nichols |
| 2011/0193362 A1 | 8/2011 | Prahlad et al. |
| 2011/0234414 A1 | 9/2011 | Ojeda et al. |
| 2012/0029399 A1 | 2/2012 | Sankai |
| 2012/0053498 A1 | 3/2012 | Horst |
| 2012/0086366 A1 | 4/2012 | Anderson et al. |
| 2012/0109025 A1 | 5/2012 | Weinberg et al. |
| 2012/0154974 A1 | 6/2012 | Bhatnagar et al. |
| 2012/0182720 A1 | 7/2012 | Walsh |
| 2013/0010398 A1 | 1/2013 | Prahlad et al. |
| 2013/0072829 A1 | 3/2013 | Fausti et al. |
| 2013/0155020 A1 | 6/2013 | Heubel et al. |
| 2013/0226350 A1 | 8/2013 | Bergelin et al. |
| 2013/0242455 A1 | 9/2013 | Prahlad et al. |
| 2013/0285577 A1 | 10/2013 | Cebrien et al. |
| 2013/0294875 A1 | 11/2013 | Prahlad et al. |
| 2013/0330162 A1 | 12/2013 | Horinouchi |
| 2014/0035306 A1 | 2/2014 | Garcia et al. |
| 2014/0162598 A1 | 6/2014 | Villa-Real |
| 2014/0215684 A1 | 8/2014 | Hardy et al. |
| 2014/0277739 A1 | 9/2014 | Kornbluh et al. |
| 2014/0352161 A1 | 12/2014 | Ranieri et al. |
| 2015/0123647 A1 | 5/2015 | Gisby et al. |
| 2015/0132974 A1 | 5/2015 | Kapella |
| 2015/0266180 A1 | 9/2015 | Kornbluh et al. |
| 2015/0266181 A1 | 9/2015 | Kornbluh et al. |
| 2015/0321339 A1 | 11/2015 | Asbeck et al. |
| 2016/0004308 A1 | 1/2016 | Cruz-Hernandez et al. |
| 2016/0025459 A1 | 1/2016 | Kwint et al. |
| 2016/0030835 A1 | 2/2016 | Argiro |
| 2016/0070347 A1 | 3/2016 | McMillen et al. |
| 2016/0101516 A1 | 4/2016 | Kornbluh et al. |
| 2016/0101517 A1 | 4/2016 | Kornbluh et al. |
| 2016/0115707 A1 | 4/2016 | Schneider et al. |
| 2016/0120734 A1 | 5/2016 | Ishikawa et al. |
| 2016/0124548 A1 | 5/2016 | Cherif et al. |
| 2016/0162022 A1 | 6/2016 | Seth |
| 2016/0187973 A1 | 6/2016 | Shankar et al. |
| 2016/0187977 A1 | 6/2016 | Cruz-Hernandez et al. |

(56) References Cited

U.S. PATENT DOCUMENTS

| | | |
|---|---|---|
| 2016/0209448 A1 | 7/2016 | Currie et al. |
| 2016/0213548 A1 | 7/2016 | John et al. |
| 2016/0224115 A1 | 8/2016 | Olien et al. |
| 2016/0259417 A1 | 9/2016 | Gu |
| 2016/0278948 A1 | 9/2016 | Piercy et al. |
| 2016/0313630 A1 | 10/2016 | Elmohtaseb |
| 2016/0342207 A1 | 11/2016 | Beran |
| 2016/0361179 A1 | 12/2016 | Mateus Dias Quinaz |
| 2016/0363887 A1 | 12/2016 | Nodera et al. |
| 2016/0363997 A1 | 12/2016 | Black et al. |
| 2016/0378071 A1 | 12/2016 | Rothkopf |
| 2017/0014111 A1 | 1/2017 | Hulseman et al. |
| 2017/0038839 A1 | 2/2017 | Seth |
| 2017/0055596 A1 | 3/2017 | Colby et al. |
| 2017/0061753 A1 | 3/2017 | Khoshkava et al. |
| 2017/0131769 A1 | 5/2017 | Keller et al. |
| 2017/0131770 A1 | 5/2017 | Keller et al. |
| 2017/0160807 A1* | 6/2017 | Keller ............... G06F 3/014 |
| 2017/0165567 A1 | 6/2017 | Walters |
| 2017/0168375 A1 | 6/2017 | Lajoie |
| 2017/0168565 A1 | 6/2017 | Cohen et al. |
| 2017/0176267 A1 | 6/2017 | Keller et al. |
| 2017/0185152 A1 | 6/2017 | Keller et al. |
| 2017/0210302 A1 | 7/2017 | Le |
| 2017/0212589 A1 | 7/2017 | Domenikos et al. |
| 2017/0222576 A1 | 8/2017 | Majidi et al. |
| 2017/0235213 A1 | 8/2017 | Clearman |
| 2017/0248272 A1 | 8/2017 | Ullrich et al. |
| 2017/0273374 A1 | 9/2017 | Howland et al. |
| 2017/0319950 A1 | 11/2017 | Buchanan et al. |
| 2017/0371416 A1* | 12/2017 | Zeitler ............... G06F 3/014 |
| 2018/0039302 A1 | 2/2018 | Levesque et al. |
| 2018/0055713 A1 | 3/2018 | Cromie et al. |
| 2018/0056104 A1 | 3/2018 | Cromie et al. |
| 2018/0077976 A1 | 3/2018 | Keller et al. |
| 2018/0081436 A1 | 3/2018 | Keller et al. |
| 2018/0081437 A1 | 3/2018 | Taylor et al. |
| 2018/0081439 A1 | 3/2018 | Daniels |
| 2018/0098583 A1 | 4/2018 | Keller et al. |
| 2018/0107277 A1 | 4/2018 | Keller et al. |
| 2018/0140441 A1 | 5/2018 | Poirters |
| 2018/0143687 A1 | 5/2018 | Moessinger et al. |
| 2018/0151281 A1 | 5/2018 | Khoshkava et al. |
| 2018/0153722 A1 | 6/2018 | Cromie et al. |
| 2018/0196515 A1 | 7/2018 | Appleyard et al. |
| 2018/0258562 A1 | 9/2018 | Fukuhara |
| 2018/0260052 A1 | 9/2018 | Karagozler |
| 2018/0311570 A1 | 11/2018 | Buchanan et al. |
| 2018/0314334 A1 | 11/2018 | Appleyard et al. |
| 2018/0319020 A1 | 11/2018 | Prahlad et al. |
| 2018/0324896 A1 | 11/2018 | Pratt et al. |
| 2018/0335841 A1 | 11/2018 | Rubin et al. |
| 2018/0361566 A1 | 12/2018 | Kombluh et al. |
| 2018/0368559 A1 | 12/2018 | Wang et al. |
| 2018/0373331 A1 | 12/2018 | Holbery et al. |
| 2019/0004602 A1 | 1/2019 | Holbery |
| 2019/0101981 A1 | 4/2019 | Elias et al. |
| 2019/0101983 A1 | 4/2019 | Cohen et al. |
| 2019/0102927 A1 | 4/2019 | Yokokawa |
| 2019/0176320 A1 | 6/2019 | Smith et al. |
| 2019/0204921 A1 | 7/2019 | Goupil et al. |
| 2019/0209086 A1 | 7/2019 | Huang et al. |
| 2019/0247050 A1 | 8/2019 | Goldsmith |
| 2019/0282131 A1 | 9/2019 | Chang et al. |
| 2019/0283247 A1 | 9/2019 | Chang et al. |
| 2019/0339773 A1 | 11/2019 | Holbery et al. |
| 2019/0343707 A1 | 11/2019 | Riener et al. |
| 2019/0346938 A1 | 11/2019 | Wang et al. |
| 2019/0352808 A1 | 11/2019 | Yoon et al. |
| 2020/0012344 A1 | 1/2020 | McMillen et al. |
| 2020/0012345 A1* | 1/2020 | Wang ............... G06F 3/016 |
| 2020/0016363 A1 | 1/2020 | Macri et al. |
| 2020/0029635 A1 | 1/2020 | Kiemele et al. |
| 2020/0081532 A1 | 3/2020 | Yoon et al. |
| 2020/0081533 A1 | 3/2020 | Holbery et al. |
| 2020/0170750 A1 | 6/2020 | Coppersmith |
| 2020/0371591 A1 | 11/2020 | Remaley et al. |
| 2020/0356168 A1 | 12/2020 | Remaley et al. |

FOREIGN PATENT DOCUMENTS

| | | |
|---|---|---|
| DE | 102015113827 A1 | 2/2017 |
| EP | 0782843 A2 | 7/1967 |
| EP | 0981423 A2 | 3/2000 |
| EP | 3343325 A1 | 7/2018 |
| FI | 127459 B | 6/2018 |
| FR | 3040803 A1 | 3/2017 |
| GB | 2488760 A | 9/2012 |
| JP | H06126661 A | 5/1994 |
| JP | 2005227111 A | 8/2005 |
| WO | 2005089176 A2 | 9/2005 |
| WO | 2011116357 A2 | 9/2011 |
| WO | 2016012480 A2 | 1/2016 |
| WO | 2016057963 A1 | 4/2016 |
| WO | 2016070078 A1 | 5/2016 |
| WO | 2017199035 A1 | 11/2017 |
| WO | 2018031476 A1 | 2/2018 |
| WO | 2018059737 A1 | 4/2018 |
| WO | 2018122106 A1 | 7/2018 |

OTHER PUBLICATIONS

"Non Final Office Action Issued in U.S. Appl. No. 16/046,708", dated Mar. 2, 2020, 9 Pages.

"Non Final Office Action Issued in U.S. Appl. No. 16/123,682", dated Apr. 24, 2020, 15 Pages.

"Non Final Office Action Issued in U.S. Appl. No. 16/124,834", dated Mar. 23, 2020, 15 Pages.

"Notice of Allowance Issued in U.S. Appl. No. 16/406,202", dated Apr. 15, 2020, 8 Pages.

"Non Final Office Action Issued in U.S. Appl. No. 16/422,801", dated Mar. 11, 2020, 14 Pages.

"Dupont LuxPrint 8153", Retrieved From: https://www.dupont.com/content/dam/dupont/products-and-services/electronic-and-electrical-materials/documents/prodlib/8153.pdf, Oct. 2009, 3 Pages.

"Non Final Office Action Issued in U.S. Appl. No. 15/620,672", dated Apr. 29, 2019, 54 Pages.

"Non Final Office Action Issued in U.S. Appl. No. 15/968,677", dated Apr. 29, 2019, 44 Pages.

Azambuja, Enaie, "Electroadhesive Clutch Substitutes Conventional ones in Robotics", Retrieved from: https://www.electronicspecifier.com/robotics/electroadhesive-clutch-substitutes-conventional-ones-in-robotics, Jul. 8, 2016, 5 Pages.

Bauer, et al., "Electromechanical Characterization and Measurement Protocol for Dielectric Elastomer Actuators", In Proceedings of SPIE—The International Society for Optical Engineering, vol. 6168, Mar. 20, 2006, 2 Pages.

Bianchi, Matted, "A Fabric-Based Approach for Wearable Haptics", In Journal of Electronics, vol. 5, Issue 3, Jul. 26, 2017, 14 Pages.

Bolzmacher, et al., "Polymer Based Actuators for Virtual Reality Devices", In Proceedings of SPIE, vol. 5385, Jul. 27, 2004, pp. 281-289.

Cassar, et al., "A Force Feedback Glove Based on Magnetorheological Fluid: Preliminary Design Issues", In Proceedings of 15th IEEE Mediterranean Electrotechnical Conference, May 2010, 7 Pages.

Choi, et al., "Wolverine: A Wearable Haptic Interface for Grasping in VR", In Proceedings of 29th Annual Symposium on User Interface Software and Technology, Oct. 16, 2016, 3 Pages.

Cohen, et al., "Virtual Reality Robotic Telesurgery Simulations using Memica Haptic System", In proceedings of the SPIE Smart Structures Conference, vol. 4329, Mar. 5, 2001, 7 Pages.

Delph, et al., "Modeling and Design of a Tendon Actuated Soft Robotic Exoskeletonfor Hemiparetic Upper Limb Rehabilitation", In Proceedings of 37th Annual International Conference of the IEEE Engineering in Medicine and Biology Society (EMBC), Aug. 25, 2015, pp. 3889-3892.

Diller, et al., "A Lightweight, Low-Power Electroadhesive Clutch and Spring for Exoskeleton Actuation", In Proceedings of IEEE International Conference on Robotics and Automation, May 16, 2016, 8 Pages.

(56) References Cited

OTHER PUBLICATIONS

Diller, Stuart, "Demonstration: Electroadhesive Clutch", Retrieved From: https://www.youtube.com/watch?v=CufiVK76fPQ, Jul. 7, 2016, 2 Pages.

Diller, et al., "Exoskeleton Walking with a Lightweight, low-power Electroadhesive Clutch and Spring", In Proceedings of IEEE International Conference on Robotics and Automation (ICRA), Mar. 2016, 2 Pages.

Frediani, et al., "Wearable Wireless Tactile Display for Virtual Interactions with Soft Bodies", In Journal of Bioengineering and Biotechnology, vol. 2, Article 31, Sep. 2014, 7 Pages.

Gallego, Jelor, "New Super-Light Exoskeleton Created to Enhance the Human Body", Retrieved From: https://futurism.com/new-super-light-exoskeleton-created-to-enhance-the-human-body, Jul. 20, 2016, 4 Pages.

Heo, et al., "Current Hand Exoskeleton Technologies for Rehabilitation and Assistive Engineering", In International Journal of Precision Engineering and Manufacturing, vol. 13, Issue 5, May 1, 2012, pp. 807-824.

Holbery, et al., "Electrostatic Slide Clutch with Bidirectional Drive Circuit", Application as Filed in U.S. Appl. No. 15/968,677, filed May 1, 2018, 36 Pages.

Kumar, et al., "MuJoCo HAPTIX: A Virtual Reality System for Hand Manipulation", In Proceedings of IEEE 15th International Conference on Humanoid Robots (Humanoids), Nov. 3, 2015, 7 Pages.

Lai, Richard, "Dexmo Exoskeleton Glove lets you Touch and Feel in VR", Retrieved From: https://www.engadget.com/2016/08/24/dexmo-exoskeleton-glove-force-feedback/, Aug. 24, 2016.

"International Search Report and Written Opinion Issued in PCT Application No. PCT/US19/028425", dated Jul. 3, 2019, 11 Pages.

"International Search Report and Written Opinion Issued in PCT Application No. PCT/US2017/062119", dated Mar. 12, 2018, 12 Pages.

Pessina, Laure-Anne, "Ultra-light Gloves Let Users "touch" virtual objects", Retrieved from: https://actu.epf.ch/news/ultra-light-gloves-let-users-touch-virtual-objects/, Oct. 15, 2018, 3 Pages.

Shintake, et al., "Versatile Soft Grippers With Intrinsic Electroadhesion based Onmultifunctional Polymer Actuators", In Journal of Advanced Materials, vol. 28, Issue 2, Jan. 2016, pp. 1-28.

Xiloyannis, et al., "Preliminary design and control of a soft exosuit for assisting elbow movements and hand grasping in activities of daily living", In Journal of Rehabilitation and Assistive Technologies Engineering, vol. 4, Jan. 1, 2017, 15 pages.

Ye, et al., "Force-Sensing Glove System for Measurement of Hand Forces during Motorbike Riding", Retrieved from: http://journals.sagepub.com/doi/full/10.1155/2015/545643, Nov. 29, 2015, pp. 1-9.

Ying, et al., "Visualization Bio-Mimetic Model of Muscular Drive", In Proceedings of IEEE International Symposium on Industrial Electronics, Jun. 4, 2007, 3 pages.

Zhang, et al., "Dielectric Elastomer Actuators for a Portable Force Feedback Device", In Proceedings of the 4th International Symposium on Haptic Interfaces for Virtual Environment and Teleoperator Systems, Mar. 25, 2006, 8 Pages.

"Final Office Action Issued in U.S. Appl. No. 15/620,672", dated Nov. 26, 2019, 46 Pages.

"International Search Report and Written Opinion Issued in PCT Application No. PCT/US2019/038847", dated Oct. 2, 2019, 11 Pages.

"International Search Report and Written Opinion Issued in PCT Application No. PCT/US2019/038833", dated Nov. 5, 2019, 21 Pages.

"Non Final Office Action Issued in U.S. Appl. No. 16/123,682", dated Oct. 15, 2019, 32 Pages.

"Final Office Action Issued in U.S. Appl. No. 15/968,677", dated Oct. 21, 2019, 26 Pages.

"International Search Report and Written Opinion Issued in PCT Application No. PCT/US2019/038075", dated Sep. 9, 2019, 12 Pages.

"Plexus—high performance VR/AR gloves", Retrieved from: https://web.archive.org/web/20190306150539/http://plexus.ml, Mar. 6, 2019, 2 pages.

Gabardi, et al., "A new wearable fingertip haptic interface for the rendering of virtual shapes and surface features", In Proceedings of the IEEE Haptics Symposium, Apr. 8, 2016, pp. 140-146.

Schorr, Samuel, "Wearable Skin Deformation Feedback for Force Sensory Substitution in Virtual Reality", Retrieved from: https://web.archive.org/web/20141114233415/https:/www.samuelschorr.com/research.html, Nov. 14, 2014, 8 Pages.

"Final Office Action Issued in U.S. Appl. No. 16/046,708", dated Aug. 3, 2020, 11 Pages.

"Notice of Allowance issued in U.S. Appl. No. 16/123,682", dated Aug. 4, 2020, 11 Pages.

"Final Office Action Issued in U.S. Appl. No. 16/422,801", dated Jun. 22, 2020, 23 Pages.

"International Search Report and Written Opinion Issued in PCT Application No. PCT/US2020/026953", dated Jul. 6, 2020, 12 Pages.

Hinchet, et al., "DextrES: Wearable Haptic Feedback for Grasping in VR via a Thin Form-Factor Electrostatic Brake", In Proceedings of the 31st Annual ACM Symposium on user Interface Software and Technology, Oct. 14, 2018, pp. 901-912.

"International Search Report & Written Opinion issued in PCT Application No. PCT/US2020/028379", dated Jul. 31, 2020, 10 Pages.

"Final Office Action Issued in U.S. Appl. No. 16/124,834", dated Sep. 28, 2020, 21 Pages.

"Non Final Office Action Issued in U.S. Appl. No. 16/422,801", dated Nov. 18, 2020, 17 Pages.

"International Search Report and the Written Opinion Issued in PCT Application No. PCT/US2020/028381", dated Jul. 14, 2020, 9 pages.

* cited by examiner

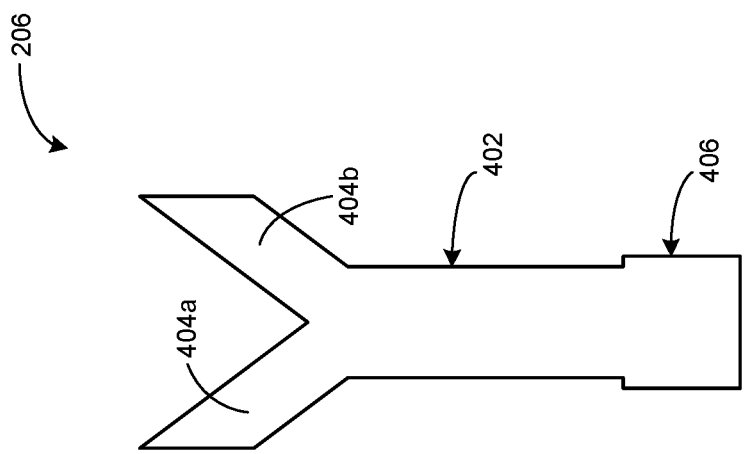
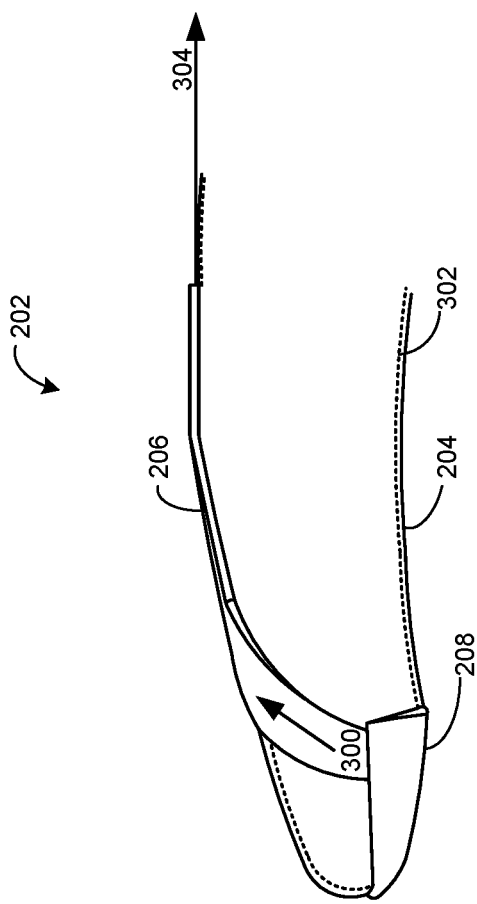

HAPTIC FEEDBACK APPARATUS

BACKGROUND

Virtual reality display systems immerse a user in virtual imagery occupying an entire field of view. Augmented reality or mixed reality display systems display virtual objects superimposed with real-world backgrounds, such as via a see-through display. In either case, visual and auditory aspects of a virtual experience may be represented in a lifelike manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to wearable articles configured to provide haptic feedback. One disclosed example provides a wearable article comprising a base configured to be worn on a body part, a force-applying mechanism coupled with the base, and a haptic feedback apparatus coupled with the base, the haptic feedback apparatus comprising a lever supported by a frame and coupled with the force-applying mechanism, the lever positioned to move relative to the frame and apply pressure on a surface of the body part when a force is applied by the force applying mechanism.

Another disclosed example provides a wearable article configured to provide haptic feedback, the wearable article comprising a base configured to be worn on a body part, a force-applying mechanism coupled with the base, a force-transferring component coupled with the base and also coupled with the force-applying mechanism, the force-transferring component comprising a spine and at least one branch extending from the spine, the at least one branch configured to wrap partially around the body part, and a pressure-applying component configured to be positioned relative to the body part such that a force applied by the force-applying mechanism is transferred to the pressure-applying component via the force-transferring component and causes the pressure-applying component to apply pressure on the surface of the body part.

Another example provides a wearable article configured to provide haptic feedback, the wearable article comprising a fabric base configured to be worn on a body part, a force-applying mechanism coupled with the fabric base, and a haptic feedback apparatus molded onto the fabric base, the haptic feedback apparatus comprising a lever supported by a frame and coupled with the force-applying mechanism, the lever positioned to move relative to the frame and apply pressure on a surface of the body part when a force is applied by the force-applying mechanism.

BRIEF DESCRIPTION OF THE DRAWINGS

FIGS. 3 and 4 schematically show aspects of an example haptic feedback apparatus.

DETAILED DESCRIPTION

Tactile receptors of the human body, such as mechanoreceptors and nociceptors, detect mechanical stimuli and provide tactile sensations of pressure, vibration, skin stretch, etc. For example, a person may experience a pressure sensation on a finger pad, and also resistance to further motion, while the user touches or grasps a real object. However, such feedback is not sensed when interacting with virtual objects in a VR or MR experience, which may make the experience seem less realistic. Thus, a wearable device, such as a glove device, may be worn to provide such feedback. Some such devices include a clutch mechanism to selectively restrict motion of an articulable joint, such as a finger joint, so that the user senses resistance to motion at the apparent surface of a virtual object. While such a motion-restricting device may simulate a reactive force from a solid object that is felt on a joint, the device may not provide a realistic tactile sensation on the finger pads, palm, and/or other surface of a body that "contacts" the virtual object.

Thus, to provide the sensation of contact in VR and MR experiences, some wearable devices may include a haptic actuator configured to vibrate or press against the skin, in addition to an actuator to restrict joint motion. However, such devices may utilize separate actuation hardware for the motion restriction and tactile sensations, which may increase the cost, size, and complexity of a wearable device that includes both a clutch mechanism and a tactile simulator.

Accordingly, examples of haptic feedback devices that may address such issues are disclosed. Briefly, the disclosed examples utilize a motion restriction mechanism, such as a clutch mechanism, to both restrict motion and provide tactile feedback, thereby providing motion restriction and tactile feedback without using separate actuation hardware. This may help to provide for a lower device cost and more compact form factor. Further, some disclosed examples may comprise components that may be molded directly onto a wearable device, which may provide for an even more compact and comfortable device.

Figure 1:
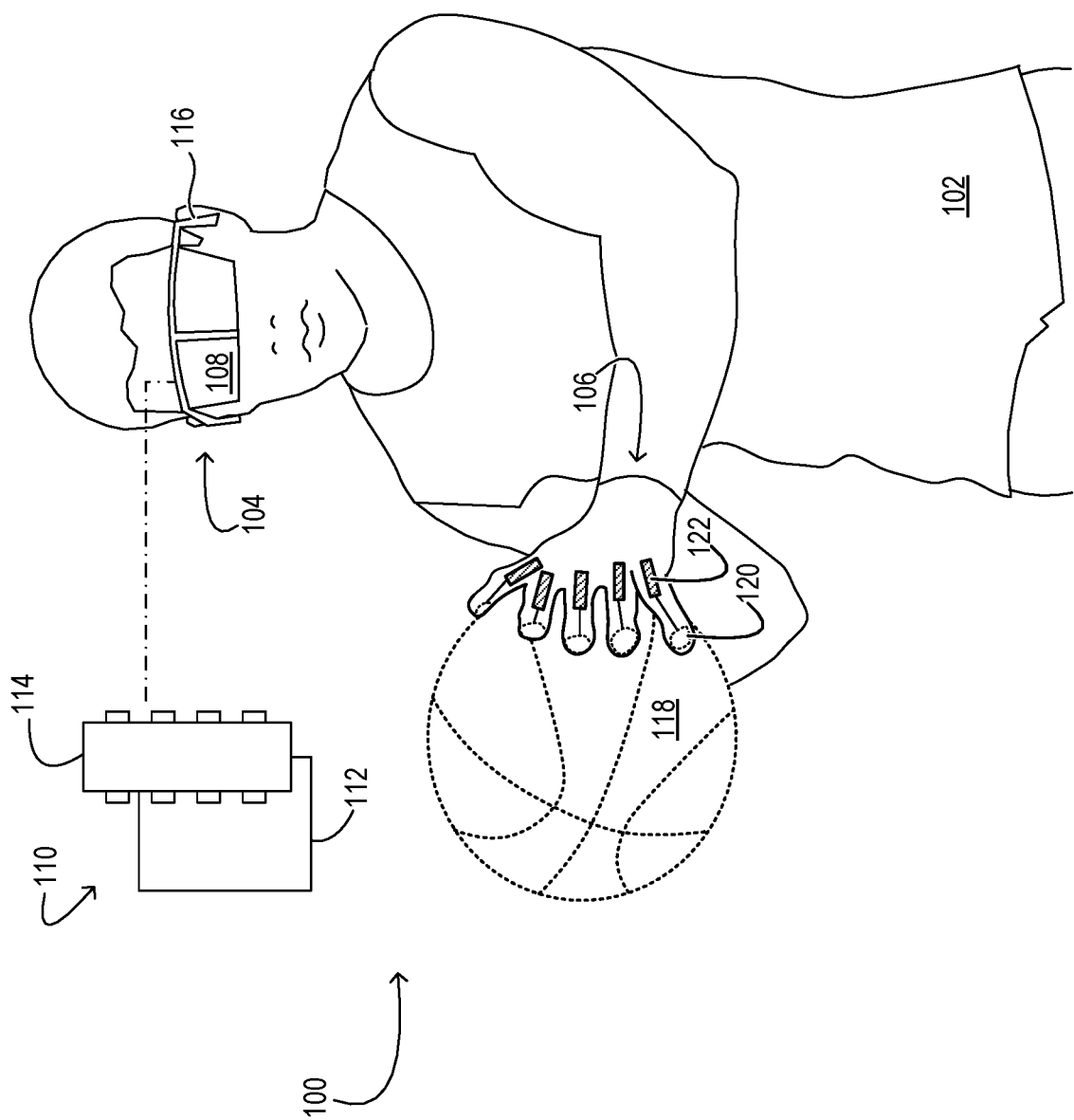
FIG. 1 shows an example use scenario in which a wearable article utilizes a haptic feedback apparatus to simulate a tactile interaction with a virtual object.

FIG. 1 shows aspects of an example display system 100 configured to present an augmented or virtual reality environment to a user 102. The display system 100 is illustrated as being used to support gameplay, but may be used in other scenarios as well, such as industrial, commercial, and healthcare scenarios. Display system 100 includes a head-mounted display (HMD) device 104 and a wearable article 106. HMD device 104 includes a near-eye display 108 configured to display virtual imagery in the user's field of view. In some examples, the near-eye display 108 is a see-through display, enabling real-world and virtual imagery to be admixed in the user's field of view. In other examples, the near-eye display 108 is opaque, providing a fully immersive virtual reality. In the HMD device 104, signals encoding the virtual display imagery are sent to the display 108 via an on-board computing device 110 which includes at least one processor 112 and associated memory 114. HMD device 104 further may include loudspeakers 116 that enable the user 102 to experience immersive audio.

Leveraging communications componentry arranged in the HMD device 104, the computing device 110 may be communicatively coupled to one or more off-board computing devices via a network. Thus, the virtual display imagery that the user 102 sees may, in some examples, be composed and/or rendered by an off-board computing device and sent wirelessly to the computing device 110. In other examples, the virtual display imagery may be composed and rendered on-board.

The wearable article 106 is configured to further augment the augmented, mixed, or virtual reality experience by providing a lifelike physical sensation responsive to user interaction with virtual imagery. In the example shown in FIG. 1 and various other examples described herein, the wearable article 106 takes the form of a glove. In other examples, a wearable article may take any other suitable form, such as a sleeve worn around an arm, leg, foot, or other body part.

The wearable article 106 may be configured to provide cutaneous pressure to a surface of the hand in response to detection of an intersection of the hand of the user 102 with a virtual object projected into a field of view of the user 102 (e.g. virtual basketball 118) to simulate tactile interactions. To provide cutaneous pressure, the wearable article 106 includes a haptic feedback apparatus 120 coupled with a force-applying mechanism 122. In some examples, the force-applying mechanism 122 may comprise a clutch mechanism configured to selectively provide a mechanically resistive physical sensation to a joint(s) of the body part on which the wearable article 106 is worn. Force applied by the clutch mechanism to resist joint movement may be transferred to the haptic feedback apparatus to apply pressure against a surface of the hand.

Figure 2:
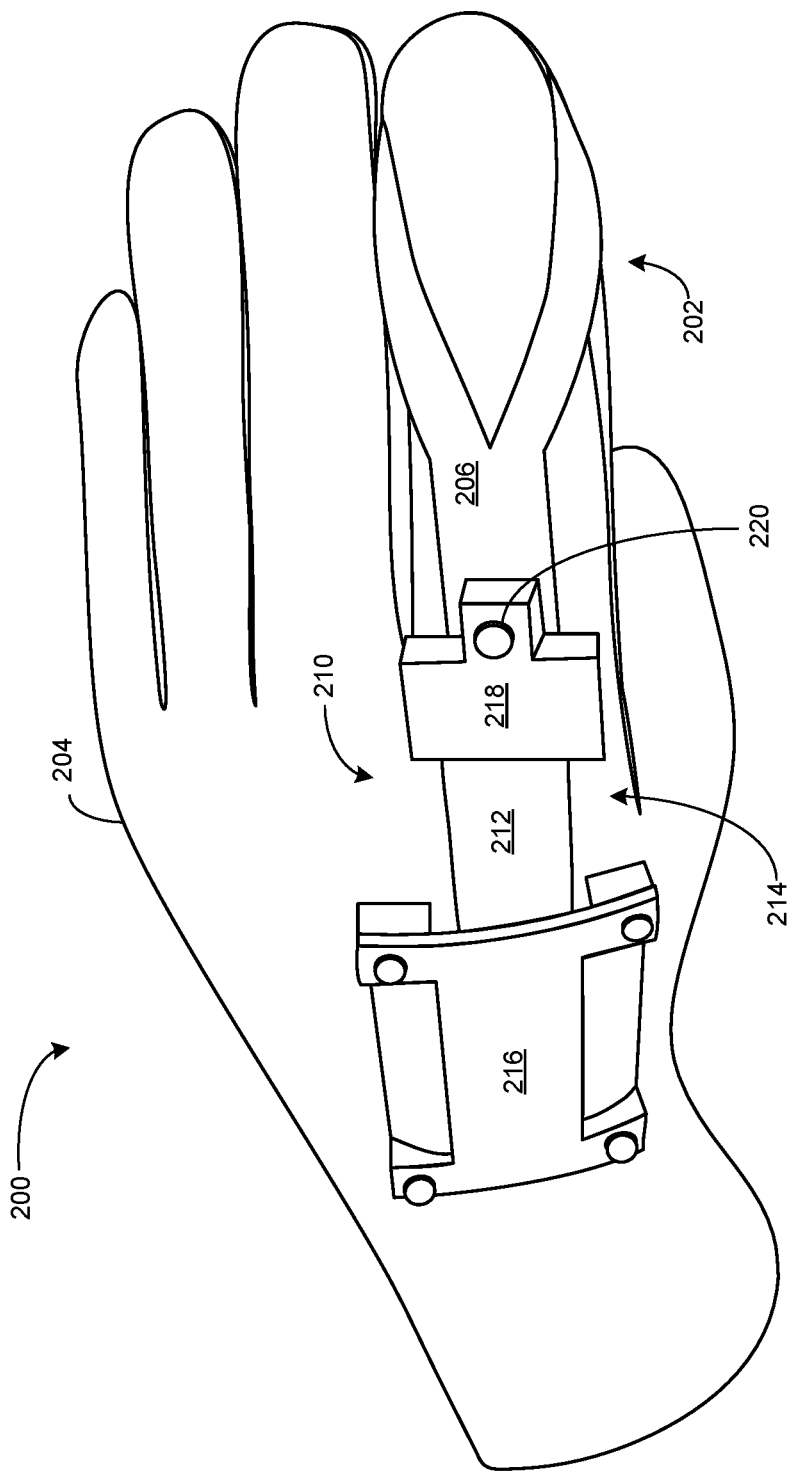
FIG. 2 schematically shows an example wearable article comprising a haptic feedback apparatus.

FIGS. 2-3 show an example wearable article 200 that may be used as the wearable article 106 in FIG. 1. The wearable article 200 comprises a haptic feedback apparatus 202 coupled with a base 204 configured to be worn on a body part, which is a hand in this example. The base 204 may comprise any suitably flexible material, such as a textile material or polymer material. In some examples the base may be formed from two or more different materials. For example, portions of the base on which the haptic feedback apparatus and/or force-applying mechanism are mounted may include a relatively less stretchable material (e.g. a woven fabric), while other portions may include a relatively more stretchable material (e.g. a knit fabric). While FIGS. 2-3 depict a haptic feedback apparatus 202 configured for an index finger, in other examples a wearable article may include a haptic feedback apparatus configured for any other finger, and/or may include multiple haptic feedback apparatuses for multiple fingers (e.g. index finger and thumb).

The haptic feedback apparatus 202 comprises a force-transferring component 206 and a pressure-applying component 208, shown in FIG. 3. The force-transferring component 206 is coupled with a force-applying mechanism 210 such that a force applied by the force-applying mechanism 210 is transferred to the pressure-applying component 208 via the force-transferring component 206. This causes the pressure-applying component 208 to move towards a surface of a body part to apply pressure on the surface of the body part. FIG. 3 depicts movement of the pressure-applying component 208 (indicated by arrow 300) towards a surface of a finger 302 in response to a pulling force (indicated by arrow 304) applied to the force-transferring component 206 by a force-applying mechanism.

The force-applying mechanism 210 may be configured to apply a force to the force-transferring component 206 in any suitable manner. In FIG. 2, the force-applying mechanism 210 comprises an electrostatic clutch system including an artificial tendon 212 connected to the base 204 at a first side of an articulable joint 214 via a first housing 216 and connected to a second side of the articulable joint 214 via a second housing 218. Electrodes may be positioned within the first housing 216, wherein one electrode is coupled to the artificial tendon 212 and another is coupled to the first housing 216 or the base 204. Application of control signals via control circuitry (not shown) to the electrodes generates an attractive electrostatic force between the electrodes, preventing the electrodes from moving relative to one another and thus preventing, via the artificial tendon 212, further flexion of the joint 214. Thus, as the finger flexes against the force applied by the clutch, a pulling force is applied to the force-transferring component 206 at a location where the force-transferring component 206 is coupled with the force-applying mechanism 210 (e.g. via a peg 220, an adhesive, and/or other suitable joint structure). In other examples, other suitable types of clutching mechanisms may be used, such as motor/cable-based mechanisms, pneumatic mechanisms, or solenoid-based mechanisms.

In the example shown in FIGS. 2 and 3, the force-transferring component 206 comprises a Y-shape that does not extend fully around the underside of the finger, but instead couples to the sides of the pressure-applying component 208. This may expose a portion of the base 204 along the palmer side of the finger 302 for placement of other sensors or devices. In other examples, the pressure-applying component may be omitted, and the force-transferring component may be attached directly to the base 204 (e.g. to the fabric of the glove) to create a sensation of pressure by pulling on the base, rather than on a separate pressure-applying component.

FIG. 4 depicts the force-transferring component 206 in more detail. The force-transferring component 206 comprises a spine 402 and one or more branches (404a and 404b in FIG. 4) that deviate from the spine 402 to couple with the pressure-applying component 208. In this example, the spine 402 is configured to extend lengthwise between a metacarpophalangeal (MCP) joint and a proximal interphalangeal (PIP) joint of the forefinger and splits, before the distal interphalangeal (DIP) joint, into two branches which extend partially around the forefinger and terminate proximate to a pressure-applying component positioned on a pad of the finger 302. In other examples, a force-transferring component may be configured to transfer force to any other suitable location on a body part.

The force-transferring component 206 also comprises an interface region 406 at which the force-transferring component 206 couples to a force-applying mechanism. The square shape of the interface region 406 in FIG. 4 is shown for example, and the interface region 400 may comprise any other suitable shape for coupling with a force-applying mechanism in other examples.

The force-transferring component 206 may be formed from any suitable flexible material. Example materials for the force-transferring component 206 include elastomeric materials that may withstand a large number of bending cycles over a lifetime of a wearable article, and that may exhibit suitably consistent performance across an expected operating temperature range. More specific examples include 90-durometer polyurethane (PU) and 95A durometer thermoplastic polyurethane (TPU). In other examples, the force-transferring component may be formed from a fabric material, such as woven fabric, with less stretch than a fabric used for the base.

In some examples, the force-transferring component 206 may be formed separately from the base (e.g. via molding in the case of a polymer material, or cutting in the case of a fabric material), and the resulting molded component may be sewn, adhered, or otherwise affixed to the base of the wearable article. In other examples, the force-transferring component 206 may be formed via molding or casting and curing directly onto the base. The resulting wearable article may be more comfortable against a user's skin than one with knots or stitching.

The pressure-applying component 208, when used, may be formed from a relatively stiffer material than that used to form the base 204 of the wearable article 200, as a stiffer material may deform less when pulled by the branches of the force-transferring component 206, and thus may provide a more realistic sensation of touching a surface with a finger pad. Examples of materials suitable for use as the pressure-applying component 208 include suitably stiff fabrics (e.g. a woven fabric) and polymeric materials (e.g. acrylonitrile butadiene styrene (ABS), polyethylene terephthalate (PET), etc.). In various examples, a pressure-applying component 208 may be shaped and/or textured to provide a certain haptic experience. Further, an embedded sensor may optionally be integrated with a wearable article in a region at which the pressure-applying component 208 is coupled with the article.

The pressure-applying component 208 may be coupled with the base 204 in any suitable manner, such as by sewing and/or an adhesive. In some examples, the pressure-applying component 208 may be coupled with the force-transferring component 206. In such examples, the force-transferring component 206 may pull directly on the pressure-applying component 208 rather than the base 204 material, which may provide more cutaneous pressure than when the force-transferring component 206 pulls on the base 204 to move the pressure-applying component 208. In other examples, the pressure-applying component 208 may be coupled with the base 204. In such examples, pulling on the base proximate to the pressure-applying component 208 causes the pressure-applying component to move toward the finger and provide tactile sensation.

Figure 5:
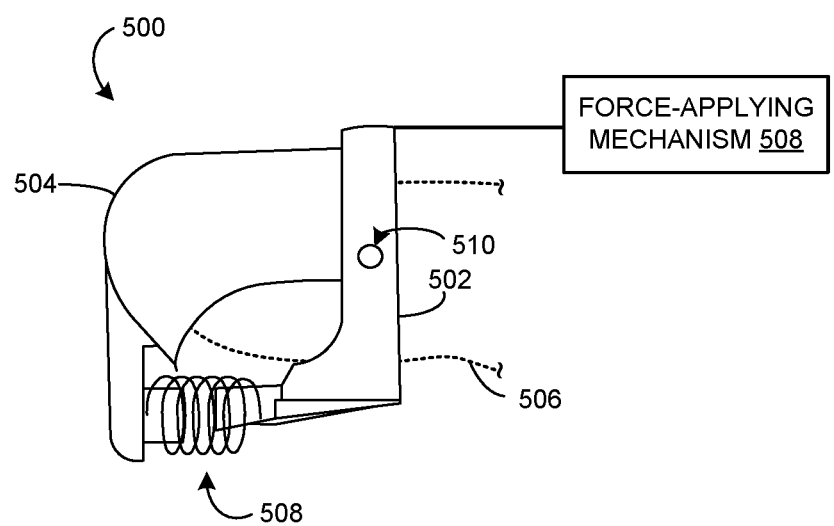
FIG. 5 schematically shows aspects of another example haptic feedback apparatus.
Figure 6A:
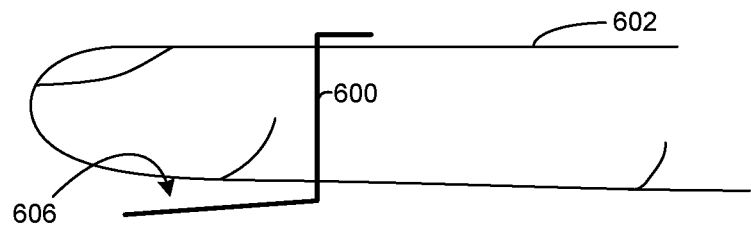
FIGS. 6A and 6B schematically show movement of a lever relative to a frame in an example haptic feedback apparatus when a force is applied by a force-applying mechanism.
Figure 6B:
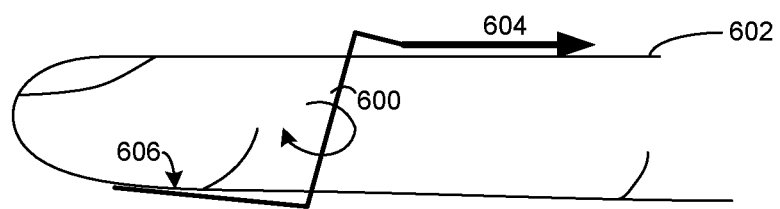

FIG. 5 schematically shows another example haptic feedback apparatus 500 that may be used to provide haptic feedback. The haptic feedback apparatus 500 has a thimble-shaped configuration configured to fit over a fingertip, and comprises a lever 502 movably coupled with a frame 504 attached to a base 506 of a wearable article. The lever 502 is coupled with a force-applying mechanism 508, and is configured to move relative to the frame 504 to apply pressure on a surface of a body part (a pad of a finger in FIG. 5) when a force is applied by the force-applying mechanism 508.

Where the force-applying mechanism 508 comprises a clutch mechanism, actuation of the clutch during finger flexion causes force to be applied to the lever 502, resulting in movement of the lever 502 and the application of cutaneous pressure. FIGS. 6A and 6B schematically show operation of the lever mechanism. As shown in FIG. 6A, the lever 600 does not exert pressure (or exerts less pressure) on a finger 602 in the absence of an applied force. In contrast, as shown in FIG. 6B, application of a pulling force (indicated by arrow 604) to the lever 600 causes the lever 600 to move about a pivot such that a haptic surface 606 of the lever 600 moves towards the finger 602 and applies/increases cutaneous pressure.

Figure 7:
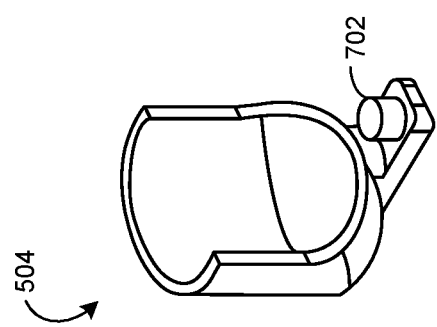
FIG. 7 shows the frame of the example haptic feedback apparatus of FIG. 5.

Returning to FIG. 5, in some examples, a haptic feedback apparatus may optionally comprise a spring 508 that biases the lever away from the body. The spring 508 may help to maintain a spacing between a finger and a haptic surface of the lever 502 until a force applied along a backside of the finger causes the lever 502 to move relative to the frame 504. While depicted as a coil spring, any suitable type of spring may be used, such as elastomeric springs, leaf springs, etc. Further, the frame 504 and/or the lever 502 may comprise structures for attaching a spring. FIG. 7 depicts one such example, in which the frame 504 includes a cylindrical peg 700 for attaching a coil spring.

Figure 8:
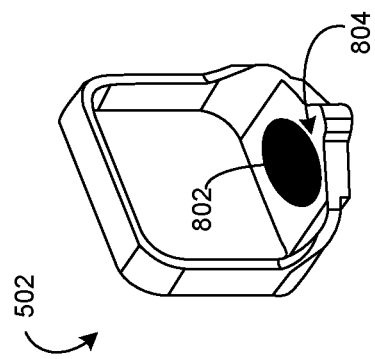
FIG. 8 shows the lever of the example haptic feedback apparatus of FIG. 5.

In some examples, a surface of the lever that applies the cutaneous pressure comprises a different material than that from which the lever is formed. Such a material may be selected for comfort (e.g. a foam material), and/or to provide a desired texture. FIG. 8 depicts an optional auxiliary material 802 attached to the haptic surface 804 of the lever 502.

The frame 504 of the haptic feedback apparatus 500 may be coupled with the base 204 in any suitable manner, such as with an adhesive. In some examples, the base 204 may comprise a less-stretchable material in a region where the frame 504 is adhered than in other regions to more efficiently transfer pulling force to the lever. In a more specific example, the base 204 may comprise a woven material where the frame 504 is attached, and a knit material in other regions where more stretch is desired.

Figure 9:
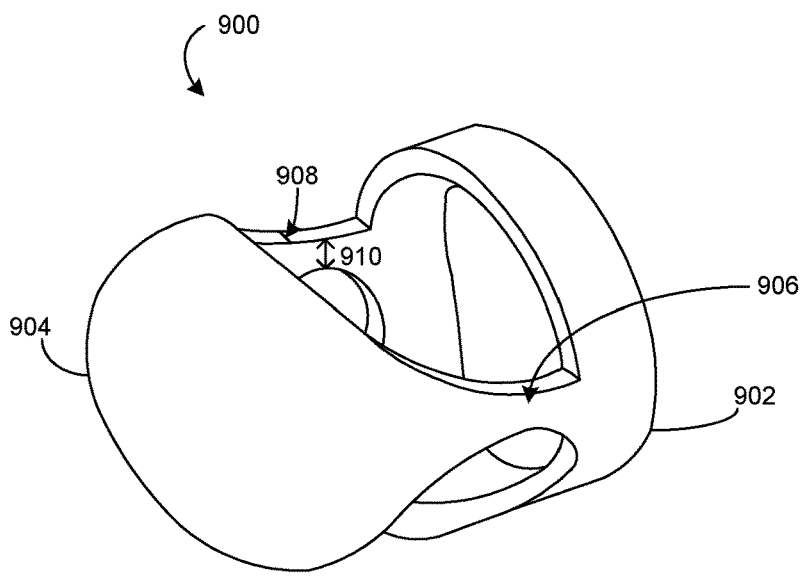
FIGS. 9 and 10 show another example haptic feedback apparatus.
Figure 10:
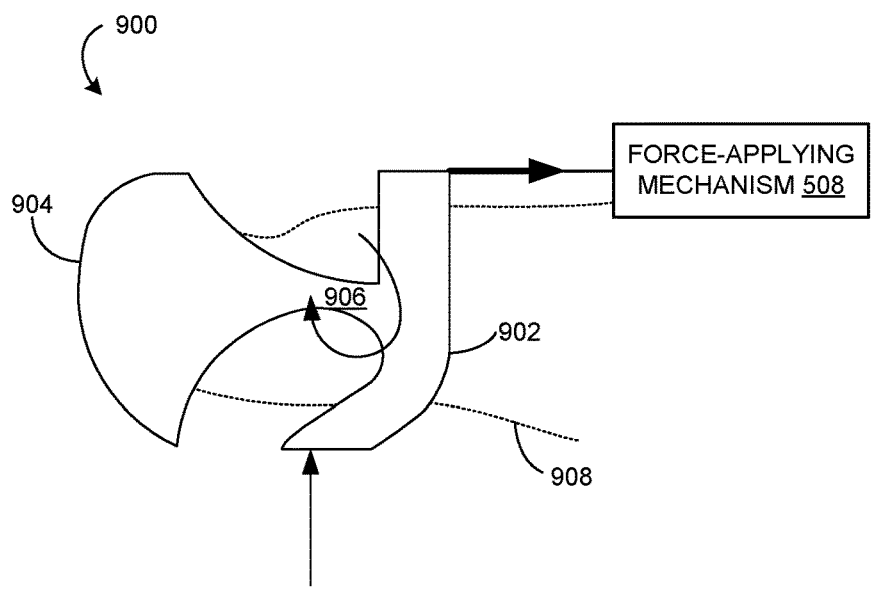

In the example of FIG. 5, the lever 502 is mechanically connected to the frame 504. In other examples, a lever and frame may be integrally formed. FIGS. 9 and 10 schematically show an example haptic feedback apparatus 900 in which the lever 902 and the frame 904 are different portions of an integral piece. The lever 902 is coupled with a force-applying mechanism 508, and configured to move relative to the frame 904 and apply pressure on a surface of a body part when a force is applied by the force-applying mechanism 508.

Each joint 906 between the frame 904 and the lever 902 serves as a pivot about which the lever may move. At each joint 906, the material from which the haptic feedback apparatus is formed may deform by stretch/compression and/or lateral displacement when the lever 902 moves. A thickness 908 (in a direction normal to the base 204) and a width 910 (in a direction tangential to the base 204) of the joint 906 may be selected to permit the lever 902 to pivot without tearing or otherwise separating from the frame 904 over many bending cycles, based upon a material from the haptic feedback apparatus 900 is formed. In one specific example, the haptic feedback apparatus is formed from a 90-durometer polyurethane material, and the joint has a thickness of 1 to 2 millimeters (mm). The lever 902, the frame 904, and the joint 906 may comprise a same thickness or different thicknesses in various examples. While depicted as having a curvature, the joint 906 may comprise any other suitable profile. In some examples, the haptic feedback apparatus 900 may be molded directly onto a base 908, while in other examples, the haptic feedback apparatus 900 may be formed as a separate component and then attached to the base 908.

In some examples, haptic feedback apparatus 900 may include a soft or textured material where the apparatus meets a body part, as described above with regard to FIG. 7. In examples where the haptic feedback apparatus 900 is molded directly on the base, such a material may be included as an insert in a molding process, or adhered after molding. Likewise, in some examples, a relatively stiffer or harder material may be incorporated for a different tactile experience. In other examples, such a material layer may be omitted.

Figure 11:
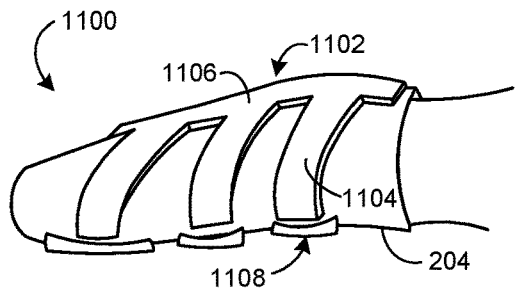
FIG. 11 shows another example haptic feedback apparatus.

In some examples, a haptic feedback apparatus as disclosed herein may be configured to apply cutaneous pressure on a different portion of a finger than the pad of the fingertip, and/or on multiple surfaces of a finger. FIG. 11 depicts an example haptic feedback apparatus 1100 that functions similarly to the haptic feedback apparatus 206 depicted in FIGS. 2 and 3. In this example, a force-transferring component 1102 includes six branches (one of which is shown as 1104) each extending outwardly from a central spine 1106 and at least partially around the base 204. Each pair of branches is configured to transfer an applied force to a respective pressure-applying component (one of which is shown as 1108). In other examples, the force-transferring component 1100 may comprise any other suitable configuration to transfer an applied force to pressure-applying components.

Figure 12:
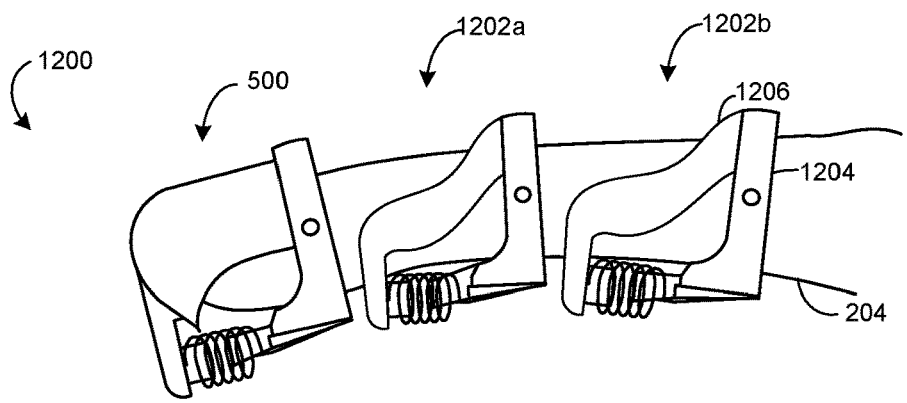
FIG. 12 shows another example haptic feedback apparatus.

FIG. 12 depicts an example wearable article 1200 that includes the haptic feedback apparatus 500 of FIG. 5, and two ring-shaped haptic feedback apparatuses 1202a, 1202b configured to be positioned on the proximal and middle phalanxes. Similar to the thimble-shaped haptic feedback apparatus 500, each ring-shaped haptic feedback apparatus 1202a, 1202b includes a lever 1204 supported by a frame 1206 and coupled with a force-applying mechanism (not shown).

Figure 13:
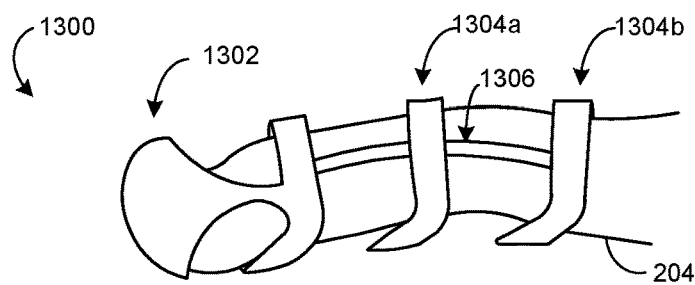
FIG. 13 shows yet another example haptic feedback apparatus.

FIG. 13 depicts an example haptic feedback apparatus 1300 comprising the haptic feedback apparatus 900 of FIG. 9, as well as two ring-shaped portions 1304a, 1304b configured to be worn around different regions of the finger. Each ring-shaped portion 1304a, 1304b acts as a lever connected to a frame 1306. The frame 1306 may be integral with thimble-shaped portion 1302 and the ring-shaped portions 1304a, 1304b, or may be mechanically coupled to these components.

Any of the disclosed haptic feedback apparatuses may be adapted for use on a different body part than a finger or thumb, such as a palm of a hand, a sole of a foot, etc. In a more specific example, providing pressure feedback to foot motion may be useful in a medical/rehabilitation MR or VR experience in which a user does not exert pressure on a surface of a foot, but instead a haptic feedback apparatus worn on the foot applies cutaneous pressure to stimulate muscles of the foot.

In some examples, a haptic feedback apparatus, including the examples described above, may be contained between fabric layers of a wearable article so that the haptic feedback apparatus is hidden from view. Such a configuration also may provide a measure of protection from damage to a haptic feedback apparatus. In some such examples, the haptic feedback apparatus may be separated from a user's skin by a fabric layer (e.g. the base). In other examples, a haptic feedback apparatus may be configured to directly contact a user's skin.

Another example provides a wearable article configured to provide haptic feedback, the wearable article comprising a base configured to be worn on a body part, a force-applying mechanism coupled with the base, and a haptic feedback apparatus coupled with the base, the haptic feedback apparatus comprising a lever supported by a frame and coupled with the force-applying mechanism, the lever positioned to move relative to the frame and apply pressure on a surface of the body part when a force is applied by the force applying mechanism. In such an example, the wearable article may additionally or alternatively comprise a spring that biases the lever away from the surface of the body part. In such an example, the haptic feedback apparatus may additionally or alternatively comprise a thimble or ring shape configured to be worn on a finger of a hand. In such an example, the lever may additionally or alternatively be pivotally connected to the frame. In such an example, the lever may additionally or alternatively be integral with the frame. In such an example, the lever and the frame may additionally or alternatively comprise a molded polyurethane structure. In such an example, the lever may additionally or alternatively be made from a first, harder material, and the haptic feedback apparatus may additionally or alternatively comprise a second, softer material coupled to a surface of the lever. In such an example, the force-applying mechanism may additionally or alternatively comprise a clutch mechanism configured to restrict articulation of an articulable joint and thereby apply a pulling force to the lever.

Another example provides a wearable article configured to provide haptic feedback, the wearable article comprising a base configured to be worn on a body part, a force-applying mechanism coupled with the base, a force-transferring component coupled with the base and also coupled with the force-applying mechanism, the force-transferring component comprising a spine and at least one branch extending from the spine, the at least one branch configured to wrap partially around the body part, and a pressure-applying component configured to be positioned on relative to the body part such that a force applied by the force-applying mechanism is transferred to the pressure-applying component via the force-transferring component and causes the pressure-applying component to apply pressure to the surface of the body part. In such an example, the base may additionally or alternatively comprise a fabric material. In such an example, the force-transferring component may additionally or alternatively be molded onto the fabric material. In such an example, the spine may additionally or alternatively be configured to be positioned on a dorsal side of a finger, and the pressure-applying component may additionally or alternatively be configured to be positioned on a palmer side of the finger. In such an example, the pressure-applying component may additionally or alternatively comprise a less stretchable material than the force-transferring component. In such an example, the force-applying mechanism may additionally or alternatively comprise a clutch mechanism configured to selectively restrict articulation of an articulable joint. In such an example, the force-transferring component may additionally or alternatively comprise at least two branches extending outwardly from the spine, the at least two branches extending in opposite directions. In such an example, the force-transferring component may additionally or alternatively be sewn onto the base.

Another example provides a wearable article configured to provide haptic feedback, the wearable article comprising a fabric base configured to be worn on a body part, a force-applying mechanism coupled with the fabric base, and a haptic feedback apparatus molded onto the fabric base, the haptic feedback apparatus comprising a lever supported by a frame and coupled with the force-applying mechanism, the lever positioned to move relative to the frame and apply pressure on a surface of the body part when a force is applied by the force-applying mechanism. In such an example, the lever may additionally or alternatively be pivotally connected to the frame. In such an example, the lever may additionally or alternatively be integral with the frame. In such an example, the wearable article may additionally or alternatively comprise a second haptic feedback apparatus molded onto the fabric base at a different location than the haptic feedback apparatus.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable article, configured to be worn by a human and to provide haptic feedback to the human, the wearable article comprising:
   a base configured to be worn on a body part of the human;
   a force-applying mechanism coupled with the base; and
   a haptic feedback apparatus, for providing the haptic feedback to the human, coupled with the base at a location corresponding to a finger of the human, the haptic feedback apparatus comprising a lever supported by a frame and coupled with the force-applying mechanism, the lever positioned to pivot about the frame and apply pressure on a surface of the body part when a force is applied by the force applying mechanism.

2. The wearable article of claim 1, further comprising a spring that biases the lever away from the surface of the body part.

3. The wearable article of claim 1, wherein the haptic feedback apparatus comprises a thimble or ring shape configured to be worn on the finger.

4. The wearable article of claim 1, wherein the lever is pivotally connected to the frame.

5. The wearable article of claim 1, wherein the lever is integral with the frame.

6. The wearable article of claim 5, wherein the lever and the frame comprise a molded polyurethane structure.

7. The wearable article of claim 1, wherein the lever is made from a first, harder material, and further comprising a second, softer material coupled to a surface of the lever.

8. The wearable article of claim 1, wherein the force-applying mechanism comprises a clutch mechanism configured to restrict articulation of an articulable joint and thereby apply a pulling force to the lever.

9. A wearable article configured to be worn by a human and to provide haptic feedback to the human, the wearable article comprising:
   a fabric base configured to be worn on a hand of a human;
   a force-applying mechanism coupled with the fabric base; and
   a haptic feedback apparatus, for providing the haptic feedback to the human, the haptic feedback apparatus molded onto the fabric base at a location corresponding to a finger of the human, the haptic feedback apparatus comprising a lever supported by a frame and coupled with the force-applying mechanism, the lever positioned to pivot about the frame and apply pressure on a surface of the body part when a force is applied by the force-applying mechanism.

10. The wearable article of claim 9, wherein the lever is pivotally connected to the frame.

11. The wearable article of claim 9, wherein the lever is integral with the frame.

12. The wearable article of claim 9, further comprising a second haptic feedback apparatus molded onto the fabric base at a different location than the haptic feedback apparatus.

* * * * *